Oct. 6, 1936.  A. A. MILLER  2,056,685

PIN ANCHOR

Filed April 29, 1936

Inventor

A. A. Miller

By Clarence A. O'Brien, and
Hyman Berman, Attorneys

Patented Oct. 6, 1936

2,056,685

UNITED STATES PATENT OFFICE 2,056,685

PIN ANCHOR

Arthur A. Miller, Selinsgrove, Pa.

Application April 29, 1936, Serial No. 77,052

1 Claim. (Cl. 24—85)

The present invention relates to new and useful improvements in pin anchors and has for its primary object to provide, in a manner as hereinafter set forth, a device of this character which is adapted to be mounted on a pin and which includes novel means for positively preventing said pin from slipping or falling out after it has been inserted.

Other objects of the invention are to provide a pin anchor or fastener of the aforementioned character which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1:
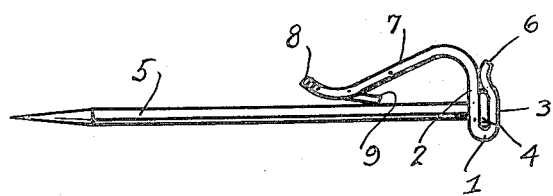
Figure 1 is a view in side elevation, showing the invention applied to a common or plain pin.
Figure 2:
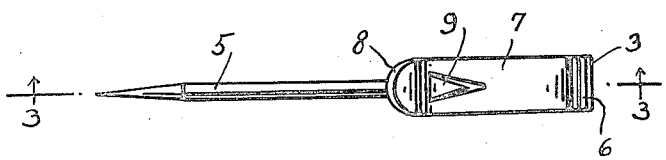
Figure 2 is a top plan view thereof.
Figure 3:
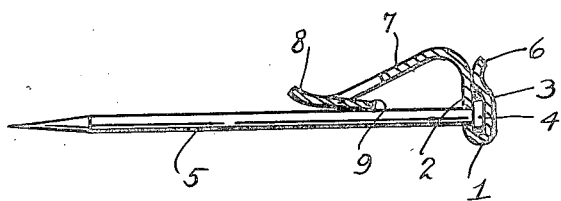
Figure 3 is a view in vertical longitudinal section, taken substantially on the line 3—3 of Figure 2.

Referring now to the drawing in detail, it will be seen that the embodiment of the invention which has been illustrated comprises a clamp 1 of suitable resilient metal, said clamp including opposed walls 2 and 3 between which the substantially flat head 4 of the pin 5 is engaged. The portion 2 of the clamp 1 has formed therein an opening for the passage of the pin 5. The portion 3 of the clamp 1 terminates in an inwardly and outwardly curved free end portion 6.

Formed integrally with the portion 2 of the clamp 1 and extending at an acute angle relative to said clamp is a resilient clip 7 which terminates, at its free end, in an out-turned lip 8. Struck inwardly from the clip 7 is an anchoring prong 9.

It is thought that the operation of the invention will be readily apparent from a consideration of the foregoing. When the pin is inserted, the material in which said pin is mounted passes between said pin and the clip 7 until arrested by the engagement of the clamp 1 with said material. When the pin is being thus inserted the prong 9 rides or slides freely over the material. However, after the pin has been inserted any reverse movement thereof causes the prong 9 to penetrate or bite into the material in a manner to securely anchor said pin. When it is desired to remove the pin the clip 7 is swung away from said pin by inserting the finger nail beneath the lip 8 in a manner to disengage the prong 9 from the material, after which the pin 5 may be conveniently removed.

It is believed that the many advantages of a pin anchor constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

A pin attachment comprising an elongated flat strip of material of irregular formation, a U-shaped pin head clamping member formed at one end of the strip for rigid clamping engagement with the head of the pin, one portion of the clamping member having an opening therein for receiving the shank of the pin, a pin shank engaging prong struck out from the strip adjacent its other end and an outwardly curved finger piece on the extremity of the strip adjacent said prong.

ARTHUR A. MILLER.